Dec. 6, 1960   L. D. CARUFEL   2,962,976
TRANSMISSIONS
Original Filed Oct. 12, 1953   4 Sheets-Sheet 1

INVENTOR.
LOUIS D. CARUFEL
BY
Hauke & Hackerty
ATTORNEYS

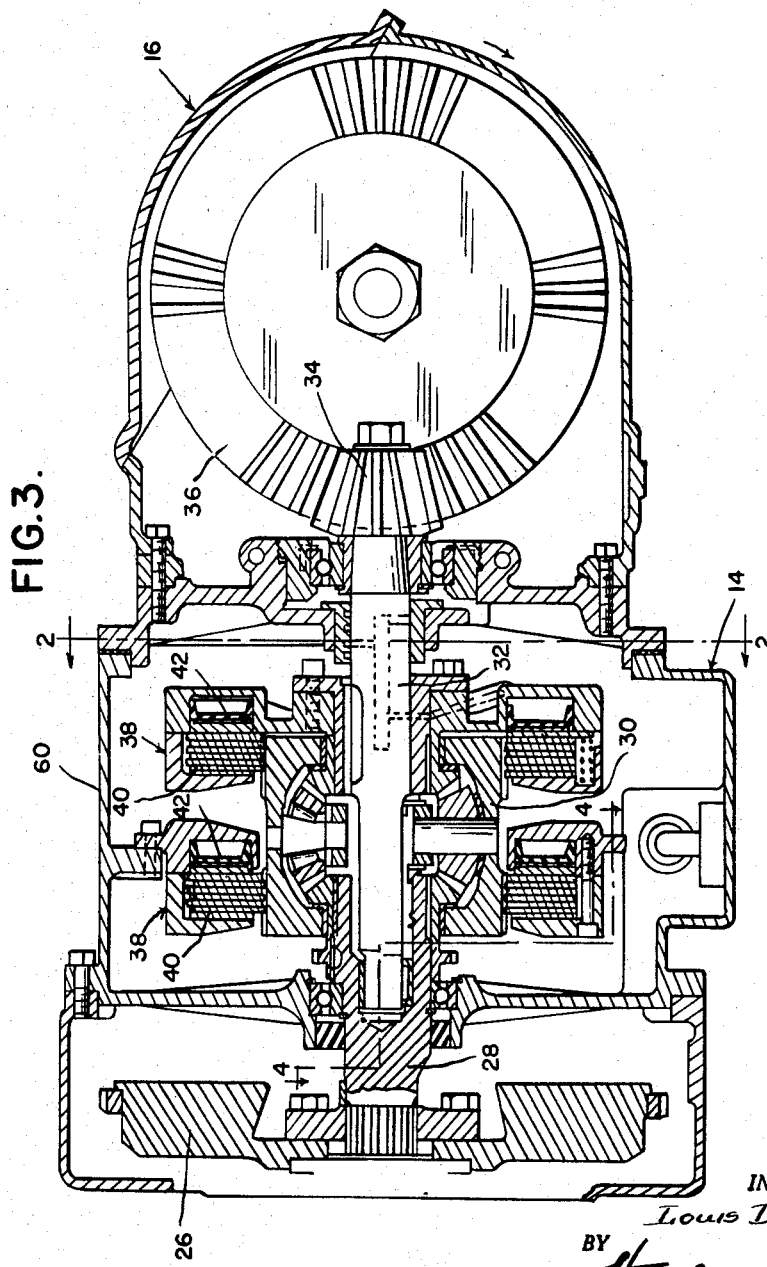

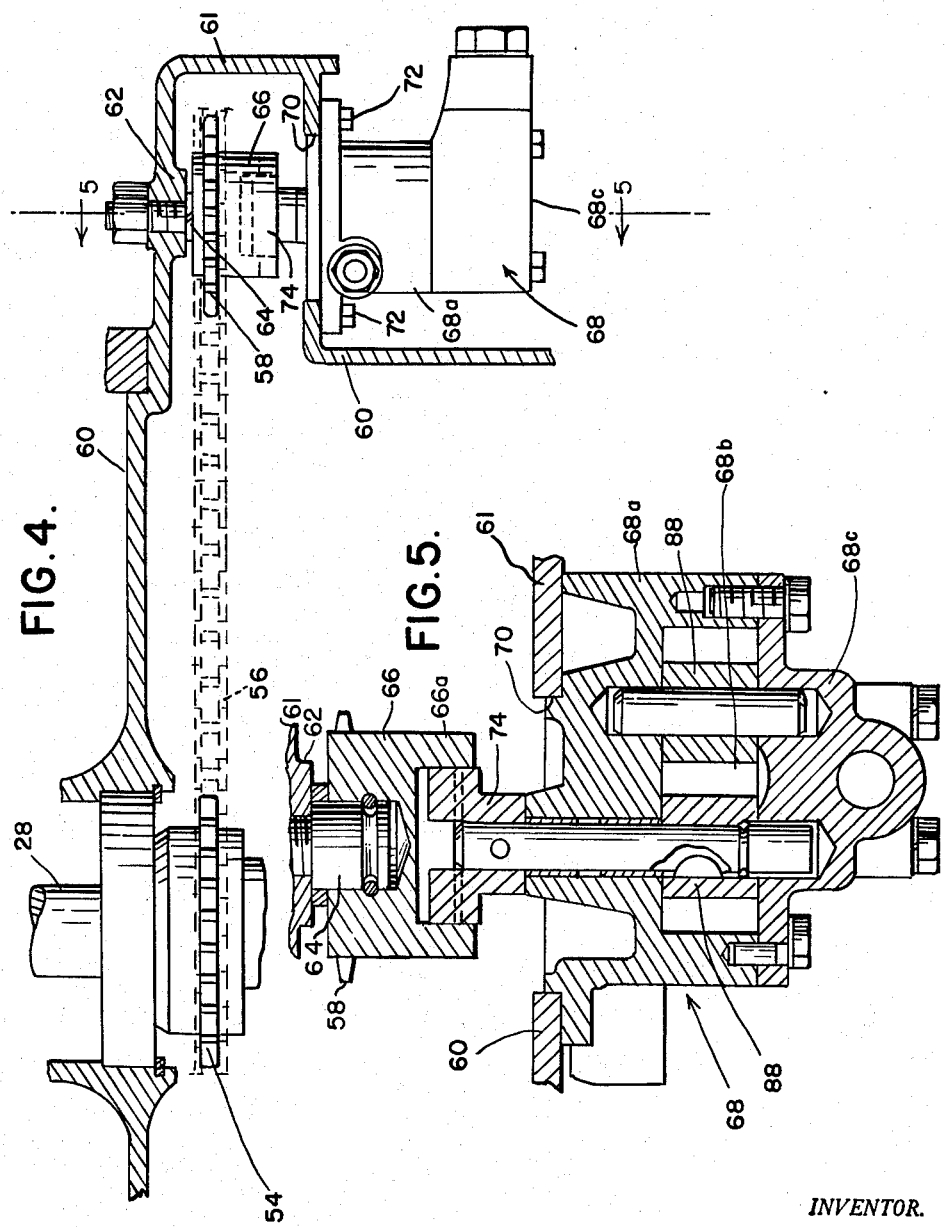

INVENTOR.
LOUIS D. CARUFEL
ATTORNEYS

United States Patent Office 2,962,976
Patented Dec. 6, 1960

2,962,976

TRANSMISSIONS

Louis D. Carufel, Muskegon, Mich., assignor to Continental Motors Corporation, Muskegon, Mich., a corporation of Virginia Original application Oct. 12, 1953, Ser. No. 385,503, now Patent No. 2,832,654, dated Apr. 29, 1958. Divided and this application Mar. 19, 1956, Ser. No. 572,601

2 Claims. (Cl. 103—218)

This invention is a division of applicant's copending application, Serial No. 385,503, filed Oct. 12, 1953, now Patent No. 2,832,654, and relates to a novel and inventive transmission and more particularly to a transmission device in which an operating oil pump is embodied in said device in such a way that the oil pump may be removed for service or replacement without disturbing any other element of the transmission.

Because of the severe loading and functional operation of oil pumps, they usually require more frequent attention than other parts of a transmission assembly. In the past, these oil pumps have been embodied inside the transmission housing together with the mechanism to which it relates and with which it cooperates. Servicing of these oil pumps becomes a major repair job, because the transmission housing must be disassembled and opened, and the internal mechanism must be disconnected to get to the oil pump requiring attention. Such servicing often has required many hours and sometimes days of labor before the unit can be put back into operation.

Where the transmission assembly is part of a drive unit for a portable cement mixer, an oil pump repair job has meant that the mixer cannot function for hours or days at a time, with consequent losses in production. The instant invention enables the cement mixer owner to have the oil pump replaced in a very short time, generally in an hour or so. This saving is due to the redesign of the transmission housing to provide for mounting the oil pump assembly on the outside of the housing where it is easy to get at the same for repair and replacement.

Another feature of the invention is the inclusion of a novel and inventive piston of simple construction in the clutch portion of the transmission.

It is an object of the invention to provide a transmission device including therewith an operating oil pump for the transmission, which oil pump is readily removable from the transmission.

Another object is to provide a simple efficient arrangement for combining a readily removable oil pump in and with a transmission device.

A further object is the provision of a transmission housing containing the transmission mechanism in conjunction with an operating oil pump for said mechanism, the oil pump being arranged on the outer surface of the housing while cooperating directly with the internal mechanism and transmission controls.

Still another object is the arrangement of a readily removable oil pump for a transmission device with the device housing in such a way that removal of the oil pump does not involve nor require disassembly of any other feature of the transmission device.

Other features of the construction will become more apparent as the description of the invention unfolds. For a visual understanding of the invention, reference may be had to the accompanying drawings in which like parts are referred to by like reference numerals throughout the several views illustrating a preferred embodiment of the invention, and in which:

Fig. 3 is a vertical sectional view of the transmission device taken substantially on the line 3—3 of Fig. 1.

Fig. 4 is a plan view of the drive means for the oil pump within the transmission device, taken on line 4—4 of Fig. 3.

Fig. 5 is a vertical sectional view of the oil pump on the line 5—5 of Fig. 4.

Figure 1:
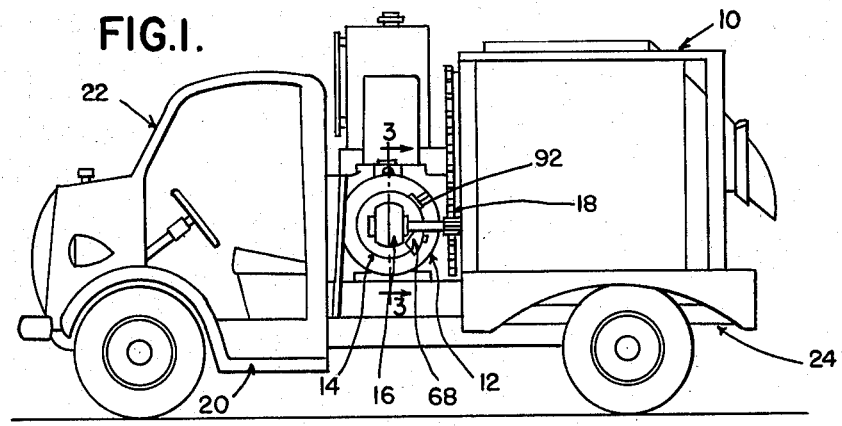
Fig. 1 is a reduced side elevational view of a portable cement mixer and tractor in which the inventive construction is embodied.

As seen in Fig. 1, a power driven cement mixer 10 is driven by an internal combustion engine 12 through a transmission 14, right angle drive mechanism 16 and a pinion and gear set 18 directly attached to mixer 10. The entire mechanism is mounted on a tractor 20 consisting of a motor and cab section 22 and a mixer carrying portion 24 rearward of the cab.

The arrangement of the portable cement mixer 10 on the tractor 20 is well known in the art and it is to be understood that no claims are made to the relationship of these units. The invention resides particularly in the transmission 14 which will be described in more detail as follows.

By reference to Fig. 3, is will be seen that the motor driven flywheel 26 is affixed to transmission input shaft 28, which in turn drives a reverse gear planetary device 30, turning output shaft 32 in driving connection, through pinion 34, with right angle ring gear 36. Ring gear 36 is directly connected at its axis with pinion and gear set 18.

The direction of rotation of output shaft 32 is determined by clutches 38 which comprise driven and driving plates 40, functionally operated by piston 42.

Affixed to the input shaft 28 is a sprocket 54 that cooperates with a link chain 56 to drive sprocket 58, see Fig. 4. The clutch drive is completely within the transmission housing 60, which has a laterally offset pocket 61 providing a support area 62 for sprocket shaft 64 which may be secured to the pocket 61 by a nut 65. A driven shaft 66 provided with a coupling element 66a is rotatably secured on the sprocket shaft 64 as shown in Fig. 5 to cooperate with an oil pump 68 and drive it. The sprocket 58 is preferably a part of the driven shaft 66. Oil pump 68 consists principally of a pump body 68a, an internal gear set 68b driven by sprocket coupling 66 and a pump body cover 68c mounted thereon.

A recessed wall opening 70 is provided in transmission housing 61, at one side thereof, to permit a simple installation of oil pump 68 therein. Equally simple is the removal of oil pump 68, which is held in operative position by bolts 72.

Oil pump 68 has a mating coupling element 74 cooperative with sprocket coupling 66, by which the oil pump is driven. This coupling, consisting of dovetailing elements 66 and 74, permits direct injection of the oil pump 68 into and through wall opening 70 with connection to the chain drive mechanism. By removing bolts 72, the oil pump 68 my be directly withdrawn through opening 70, with consequent disengagement from the chain drive mechanism.

Figure 6:
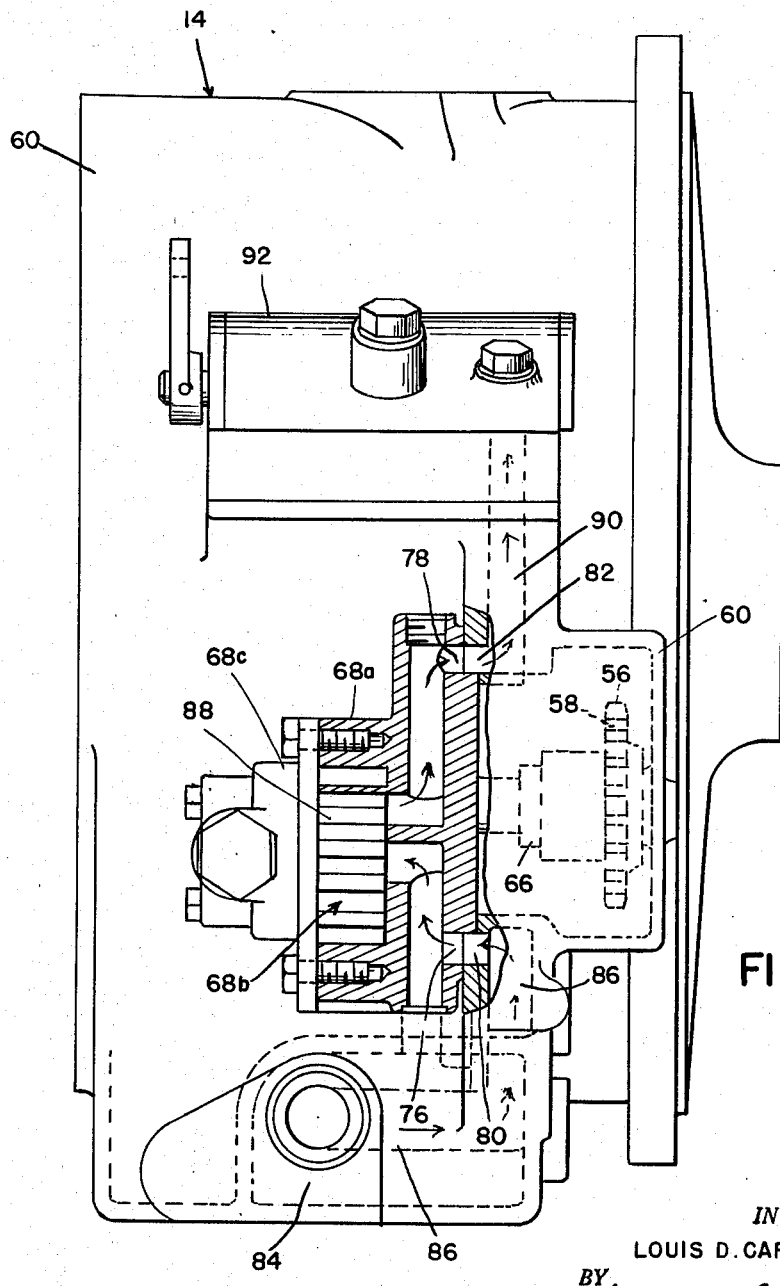
Fig. 6 is an enlarged side view, partially in section, of the transmission housing with the oil pump in position thereon, showing its relationship to the inlet and outlet ports of the transmission housing.

In order that the oil pump 68 should function cooperatively with the transmission mechanism 14, the inlet and outlet ports 76 and 78 respectively, of oil pump 68, lie directly in line with the outlet and inlet portions, 80 and 82 respectively, of the transmission housing. As seen in Figs. 3 and 6, the oil is drawn from a chamber 84 in the oil pan area of housing 60 through a passage 86 to transmission housing outlet portion 80. Oil pump inlet port 76, being aligned with housing outlet port 80, receives the fluid for a passage to oil pump gears 88, then out of pump outlet port 78 into housing inlet port 82 for passage through housing passageway 90 to the distributor valve 92.

Distributor valve 92 is a manually operated valve which directs the flow of oil into the transmission mechanism 14 for clockwise or counterclockwise rotation of output shaft 32. The detailed construction of distributor valve 92 is described in my copending application Serial No. 336,607, filed February 12, 1953, now Patent No. 2,781,056.

The distributor valve 92 directs the flow of oil into the transmission mechanism 14 to obtain direct or reverse rotation of mixer 10. By direct rotation, the ingredients contained in mixer 10 are intermixed; whereas, by reverse rotation the mixture is poured or churned out of mixer 10 for use.

It will therefore be apparent that the oil pump 68 serves a vital function in the transmission 14, in that the oil propelled by it serves to direct the rotation of mixer 10 for both mixing and pouring operations. To be able to service or replace the oil pump 68 without in any way disassembling the rest of the complex transmission mechansim is highly desirable, and this result is achieved by the arrangement here described and claimed.

Figure 2:
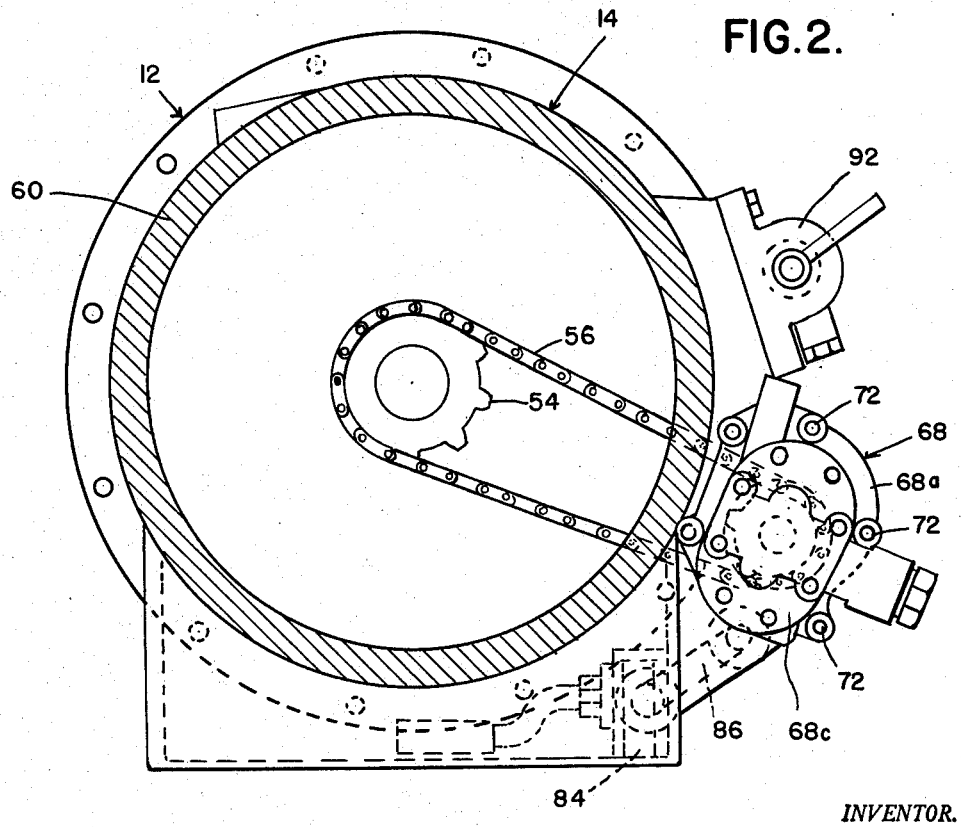
Fig. 2 is an end view of the transmission portion of the mixer drive taken substantially on the line 2—2 of Fig. 3, in which portion the transmission mechanism has been removed for clarity.

In operation, internal combustion engine 12 is set in motion in the usual manner, transferring its power through flywheel 26, transmission 14, right angle drive mechanism 16 and gear set 18 to mixer 10. By manually controlling and directing distributor valve 92, mixer 10 is caused to be rotated in a clockwise or counterclockwise direction. Oil pump 68 may be withdrawn for servicing by removing bolts 72 which anchor it in transmission housing wall opening 70. A new, or the same oil pump, may be installed directly in wall opening 70, by simply bolting it in place. Oil pump inlet port 76 will line up with housing outlet port 80, and oil pump outlet port 78 will align with housing inlet port 82 to complete the system. It will be noted, particularly in Fig. 2, that bolts 72 are not uniformly arranged about a center, thus predetermining the alignment of the ports by proper application of bolts 72 in housing pocket 61. It will be further noted that oil pump 68 is a rotary gear type pump having its inlet and outlet ports 76 and 78 respectively on the same side of the pump for alignment with transmission ports 80 and 82. The entry location of the inlet and outlet ports need not be in the same plane, but may also be arranged at right angles to each other, or in such other manner as to provide contiguous contacts between oil pump body 68a and the transmission housing 60 at the interface surfaces of the units surrounding the respective ports.

It will be apparent to those skilled in the art to which the invention pertains that various modifications and changes may be made without departing from the spirit of the invention or from the scope of the appended claims.

I claim:
1. In a transmission assembly, a transmission housing, a driving shaft disposed substantially centrally in said transmission housing, a laterally offset pocket structure disposed remotely from said driving shaft and extending outwardly from the side of said transmission housing in a plane disposed normal to said driving shaft, a driven shaft supported solely in and by said pocket structure and provided with a coupler, said driven shaft and coupler being disposed entirely within said pocket structure, means operably connecting said driving and driven shafts and disposed in said transmission housing and said pocket structure, an oil pump mounted on and disposed exteriorly of said pocket structure and having an inlet and an outlet adjacent said pocket structure, said pocket structure having oil passages communicating with and aligned with said oil pump inlet and outlet, said oil pump having a drive shaft extending into said pocket structure and separably operably connected with said coupler therein, said pocket structure having forward and rear end walls disposed in planes normal to said driving shaft, said driven shaft being rotatably carried by one of said end walls and disposed on an axis normal to the planes of said end walls, said oil pump being mounted on the other of said end walls, said means connecting the driving and driven shafts being disposed in a plane extending parallel with said end walls and normal to said driving and driven shafts, said driving and driven shafts each having a sprocket, the aforesaid means comprising a drive chain operably connecting said sprockets.

2. In a transmission assembly, a transmission housing, a driving shaft disposed substantially centrally in said transmission housing, a laterally offset pocket structure disposed remotely from said driving shaft and extending outwardly from the side of said transmission housing in a plane disposed normal to said driving shaft, a driven shaft supported solely in and by said pocket structure and provided with a coupler, said driven shaft and coupler being disposed entirely within said pocket structure, means operably connecting said driving and driven shafts and disposed in said transmission housing, an oil pump mounted on and disposed exteriorly of said pocket structure and having an inlet and an outlet adjacent said pocket structure, said pocket structure having oil passages communicating with and aligned with said oil pump inlet and outlet, said oil pump having a drive shaft extending into said pocket structure and separately operably connected with said driven shaft coupler, said pocket structure having forward and rear end walls disposed in planes normal to said driving shaft, said driven shaft being rotatably carried by one of said end walls and disposed on an axis normal to the planes of said end walls, said oil pump being mounted on the other of said end walls, said means connecting the driving and driven shafts being disposed in a plane extending parallel with said end walls and normal to said driving and driven shafts, said driving and driven shafts each having a sprocket, the aforesaid means comprising a drive chain operably connecting said sprockets, said transmission housing having a forward end wall disposed in a plane normal to said driving shaft, said pocket structure and said drive chain being disposed closely adjacent said housing forward end wall.

References Cited in the file of this patent
UNITED STATES PATENTS

| | | |
|---|---|---|
| 1,579,540 | Jackson | Apr. 6, 1926 |
| 2,046,103 | Austin | June 30, 1936 |
| 2,338,546 | Scholl | Jan. 4, 1944 |
| 2,481,047 | Sloane | Sept. 6, 1949 |
| 2,734,401 | Berndtson | Feb. 14, 1956 |
| 2,736,412 | Livezey | Feb. 28, 1956 |
| 2,765,746 | Omon | Oct. 9, 1956 |
| 2,771,974 | Mooney | Nov. 27, 1956 |

FOREIGN PATENTS

| | | |
|---|---|---|
| 75,062 | Sweden | Aug. 16, 1932 |